(12) United States Patent
Colley et al.

(10) Patent No.: US 11,624,283 B2
(45) Date of Patent: Apr. 11, 2023

(54) METHOD OF REDUCING TURBINE WHEEL HIGH CYCLE FATIGUE IN SECTOR-DIVIDED DUAL VOLUTE TURBOCHARGERS

(71) Applicant: BorgWarner Inc., Auburn Hills, MI (US)

(72) Inventors: Matthew Carson Colley, Mills River, NC (US); Craig Andrew Colont, Candler, NC (US); Dominic William DePaoli, Horse Shoe, NC (US); Sean Hastings, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 321 days.

(21) Appl. No.: 16/551,954

(22) Filed: Aug. 27, 2019

(65) Prior Publication Data
US 2020/0123907 A1   Apr. 23, 2020

Related U.S. Application Data

(63) Continuation of application No. 16/168,684, filed on Oct. 23, 2018, now Pat. No. 10,465,522.

(51) Int. Cl.
| | | |
|---|---|---|
| *F01D 5/10* | (2006.01) | |
| *F01D 5/16* | (2006.01) | |
| *F02B 37/00* | (2006.01) | |
| *F02B 39/00* | (2006.01) | |
| *F02C 6/12* | (2006.01) | |

(52) U.S. Cl.
CPC ............... *F01D 5/16* (2013.01); *F02B 37/00* (2013.01); *F02B 39/00* (2013.01); *F02C 6/12* (2013.01); *F05D 2220/40* (2013.01); *F05D 2260/83* (2013.01); *F05D 2300/501* (2013.01)

(58) Field of Classification Search
CPC ... F01D 5/16; F01D 5/28; F01D 5/282; F01D 5/284; F01D 5/286; F01D 5/288; F01D 5/12; F01D 5/14; F02B 39/00; F02B 37/00; F05D 2260/83; F05D 2300/501; F05D 2220/40; F02C 6/12
USPC ............................................. 415/119
See application file for complete search history.

(56) References Cited

U.S. PATENT DOCUMENTS

| | | | | |
|---|---|---|---|---|
| 3,664,761 A | * | 5/1972 | Zastrow .................. | F01D 9/026 415/205 |
| 4,351,154 A | * | 9/1982 | Richter .................. | F01N 13/107 60/605.1 |
| 4,512,714 A | * | 4/1985 | Kaesser ................. | F01D 17/146 415/151 |
| 4,815,931 A | * | 3/1989 | Linck ........................ | F01D 3/00 415/124.1 |
| 6,073,447 A | * | 6/2000 | Kawakami ................ | F02C 6/12 60/602 |

(Continued)

*Primary Examiner* — Long T Tran
*Assistant Examiner* — James J Kim
(74) *Attorney, Agent, or Firm* — Eric L. Doyle; Stephan A. Pendorf; Patent Central LLC

(57) ABSTRACT

High cycle fatigue (HCF) in a turbine wheel of a sector-divided dual volute turbocharger, particularly a turbocharger where the tongue-to-blade gap is as small as from 1-3% of the wheel diameter, is reduced, and energy extraction is optimized, using a turbine wheel with (blade stiffness/backwall stiffness×100) between 41 and 44.

12 Claims, 5 Drawing Sheets

(56) References Cited

U.S. PATENT DOCUMENTS

| | | | | |
|---|---|---|---|---|
| 6,948,907 B2* | 9/2005 | Vogiatzis | F01D 17/165 | 415/160 |
| 7,481,056 B2* | 1/2009 | Blaylock | F02D 23/00 | 60/602 |
| 7,694,518 B2* | 4/2010 | Whiting | F01D 9/026 | 60/602 |
| 8,172,511 B2* | 5/2012 | Duong | F04D 29/666 | 415/119 |
| 8,454,297 B2* | 6/2013 | Congiu | F01D 17/085 | 415/118 |
| 8,585,353 B2* | 11/2013 | Arnold | F02C 6/12 | 415/128 |
| 8,585,355 B2* | 11/2013 | Henderson | F01D 9/026 | 415/151 |
| 8,807,929 B2* | 8/2014 | Koenigsegg | F01D 17/18 | 415/184 |
| 10,132,190 B2* | 11/2018 | Blaylock | F02B 37/24 | |
| 10,253,633 B2* | 4/2019 | Klaus | F01D 5/141 | |
| 2007/0231141 A1* | 10/2007 | Chaing | F01D 5/16 | 416/185 |
| 2013/0219885 A1* | 8/2013 | Watson | F01D 17/148 | 60/605.1 |
| 2016/0025044 A1* | 1/2016 | Martinez-Botas | F01D 5/02 | 60/605.2 |
| 2017/0107896 A1* | 4/2017 | Gugau | F01D 5/14 | |
| 2017/0218836 A1* | 8/2017 | Higashimori | F02B 37/025 | |

* cited by examiner

METHOD OF REDUCING TURBINE WHEEL HIGH CYCLE FATIGUE IN SECTOR-DIVIDED DUAL VOLUTE TURBOCHARGERS

BACKGROUND OF THE INVENTION

Field of the Invention

In sector-divided turbine housings, two volutes, each covering a different circumferential sector, end in respective tongues. As the turbine wheel rotates, each turbine blade is excited to vibrate once as it passes the first tongue, and then again as it passes the second tongue. Experiments have suggested that turbine wheels in such dual volute turbine housings are more susceptible to high cycle fatigue (HCF), possibly due to this double excitation. This problem, though often addressed, remains in need of a simple and efficient solution. The present invention provides this solution and prolongs wheel life.

Description of the Related Art

In an internal combustion engine, hot combustion gasses push against pistons, wherein thermal energy is converted into kinetic energy. Most internal combustion engines average only around 20 percent thermal efficiency. Unused thermal and kinetic energy is released as waste through the engine exhaust and cooling systems.

Turbochargers may be used to capture some of this waste energy. Exhaust gas is directed at high velocity and pressure onto a turbine wheel, driving the wheel at speeds between 100,000 RPM and 300,000 RPM. The turbine wheel is coupled to and drives a compressor wheel. The compressor draws in fresh air, compresses it, and supplies this compressed air to an engine intake, allowing more fuel to be combusted in the cylinders, thus boosting the horsepower of the engine.

As exhaust gasses flow through the turbine wheel, heat and pressure in the exhaust gasses are converted to mechanical energy that drives rotation of the turbine wheel. Additionally, the exhaust gasses are released from the cylinders of the internal combustion engine as discrete pulses when one or more exhaust valves for a cylinder open. That is, in the exhaust stroke, as the exhaust port opens, hot exhaust gas is forcibly expelled as a pulse. The pulse travels along the exhaust manifold as a dynamic wave, enters the turbine housing volute, and impinges onto the turbine wheel (FIG. 1). The dynamic wave contains an extra pulse of pressure can start the turbine moving faster and be helpful in reducing turbo lag. In a pulse energy driven turbine, pressure at the turbine inlet is raised to a high value very soon after exhaust valve opening, and then decreases to a much lower value as the cylinder empties, until another exhaust valve opening causes it to rapidly increase again. In a multi-cylinder engine, to maintain "pulse separation", engine cylinders are divided into subgroups, with each subgroup assigned a different exhaust manifold. The turbocharger volute is also divided into multiple substantially separate volutes, with each manifold section supplying a different volute section.

Division of the volute may be meridional ("twin volute") or sector ("dual volute"; see FIGS. 1 and 2). The present invention is concerned with turbochargers with sector divided dual volute turbine housings where each volute narrows circumferentially inwardly in a spiral fashion to evenly distribute exhaust feed circumferentially about its respective sector of the wheel. Two exhaust manifolds may supply the turbine housing tangentially from the same side (FIG. 1) or from opposite sides of the turbine housing (FIG. 2). Each volute ends in a tongue. As the blades of the turbine wheel pass each tongue, they are bent or "excited" by pressure discontinuities, causing the blade to vibrate in the way a tuning fork will vibrate when struck. This is referred to as "blade pass excitation".

While sector divided dual volutes offer efficient pulse energy preservation, the two-tongue structure is a source of a particular excitation problem. As the turbine wheel rotates, each turbine blade is excited to vibrate once as it passes the first tongue, and then again as it passes the second tongue. Then the same blade passes the first tongue again, the excitation is built on again, and then the blade passes the second tongue again, etc. If the wheel is not stiff enough to damp out the excitation introduced by the first tongue, then the excitation caused by second tongue can build on it, and increase the amplitude of the excitation. With two tongues, not only is there a doubling of the number of excitations per revolution of the turbine wheel, but also a doubling of the frequency. So, unlike a single volute, where there is more time/rotation to damp out the excitation and higher rotational speeds are required to excite higher orders of vibration, with two tongues both excitation energy and excitation frequency are doubled.

Generally, a turbine wheel is designed such that the natural frequencies of the blades and the backwall are higher than excitation frequencies expected to be caused by the tongue(s) of the turbine housing volute over the normal range of operation. For example, for a single volute turbine wheel that rotates at a maximum speed of 200,000 RPM, the maximum excitation frequency would be 3,333.33 Hz because the blades would be excited once per revolution. Therefore, the turbine wheel would be designed such that the natural frequencies of the blades and backwall are above 3,333.33 Hz to avoid potentially destructive excitation of the turbinewheel. In a two-sector dual volute turbine, the blades are excited twice per revolution. As a result, for the above-described exemplary wheel that rotates at a speed of 200,000 RPM, the maximum excitation frequency would be 6,666.66 Hz due to the twice-per-revolution excitation from the two tongues. For normal turbo charger designs the frequency ranges are usually designed to clear forth order or in some applications higher to avoid HCF issues. So blade frequency to clear $4^{th}$ order for a single excitation source would be 13,332 Hz. Further for 2 per revolution the frequency would become 26,664 Hz. So with addition of two excitation sources of the dual volute the design criteria are no longer achievable, without significant increases in blade stiffness thus illuminating performance enhancement, with current commercially available materials.

The excitation frequency will at some point match the blade's resonant frequency causing the amplitude of vibration to increase significantly. As the blade vibrates or "rings", the amplitude of the bending results in strains that are confined mainly to the elastic portion of the stress strain curve. The blade can withstand such alternating stresses for a long time without breaking, but sooner or later it will fail. This is known as high cycle fatigue (HCF).

Another form of vibration, in radial-entry-axial-exhaust turbines, occurs at the turbine wheel backwall. In a radial entry turbine the hub between the blades is curved to help redirect exhaust gas flow from a radial inflow direction to an axial outflow direction. Particularly in "pulse turbocharging", the turbine wheel experiences an axial push-back as it redirects pulse energy. This can help introduce excitation into the turbine wheel backwall.

As the pursuit of improved aerodynamic performance on turbochargers continues to push the boundaries of mechanical design, the risk of HCF failures of turbine wheels is amplified, and is often the limiting factor on the durability of a turbocharger.

One conventional approach to reducing HCF involves increasing the mass of the blades for general damping of vibration. However, any increase in mass decreases the turbocharger's performance. Thickening the turbine blades increases inertial lag and decreases efficiency and transient response.

It is apparent from the above that HCF is a serious problem that has not yet been solved in an efficient manner without commercial penalty. Currently available responsive strategies decrease performance and efficiency and/or increase cost.

It is an object of the present invention to provide a method of reducing HCF of turbine wheels.

BRIEF SUMMARY OF THE INVENTION

After extensive experimentation, using computer simulations (CFD, FEA) as well as physical samples on test stands, after analyzing many simulated and actual HCF failures, the inventors discovered a feature common to the turbine wheels that were significantly resistant to HCF. Remarkably, this resistance persisted, and was actually more pronounced, in turbochargers where the tongue-to-blade gap was as small as from 1-3% of the wheel diameter, that is, where HCF would normally be expected to be higher due to sharper pressure variations exciting the blades to vibrate.

It was discovered in accordance with the invention that HCF did not appear to be a problem in turbine wheels characterized by a very specific blade to backwall stiffness ratio.

That is, when stiffness is measured by applying a predetermined force, for example, 100 Newtons, to the blade where it is most liable to bend, the radially outer circumferential end of the trailing edge of the blade, and the wheel backwall where it is most liable to bend, namely outer circumferential edge of the backwall disk half-way between blades, when the blade stiffness to backwall stiffness ratio (x 100) is between 41 and 44, more preferably when the stiffness ratio is between 41.2 and 43.5, most preferably when the stiffness ratio is between 41.5 and 43.3, HCF is reduced to commercially acceptable levels (i.e., turbine wheels are expected to exceed the service life of a turbocharger).

It is surprising that stiffness ratio of these two structures played a more significant role in HCF reduction than other investigated variables.

Although the reason for HCF reduction at this particular stiffness ratio is not fully understood, and while not wishing to be bound by any theory, it is possible that this disk to blade stiffness ratio is associated with an averaging of the normally Gaussian distributed blade frequency.

These and other features, aspects and advantages of the present invention will become better understood with reference to the following drawings, description and claims.

DETAILED DESCRIPTION OF THE INVENTION

Figure 1:
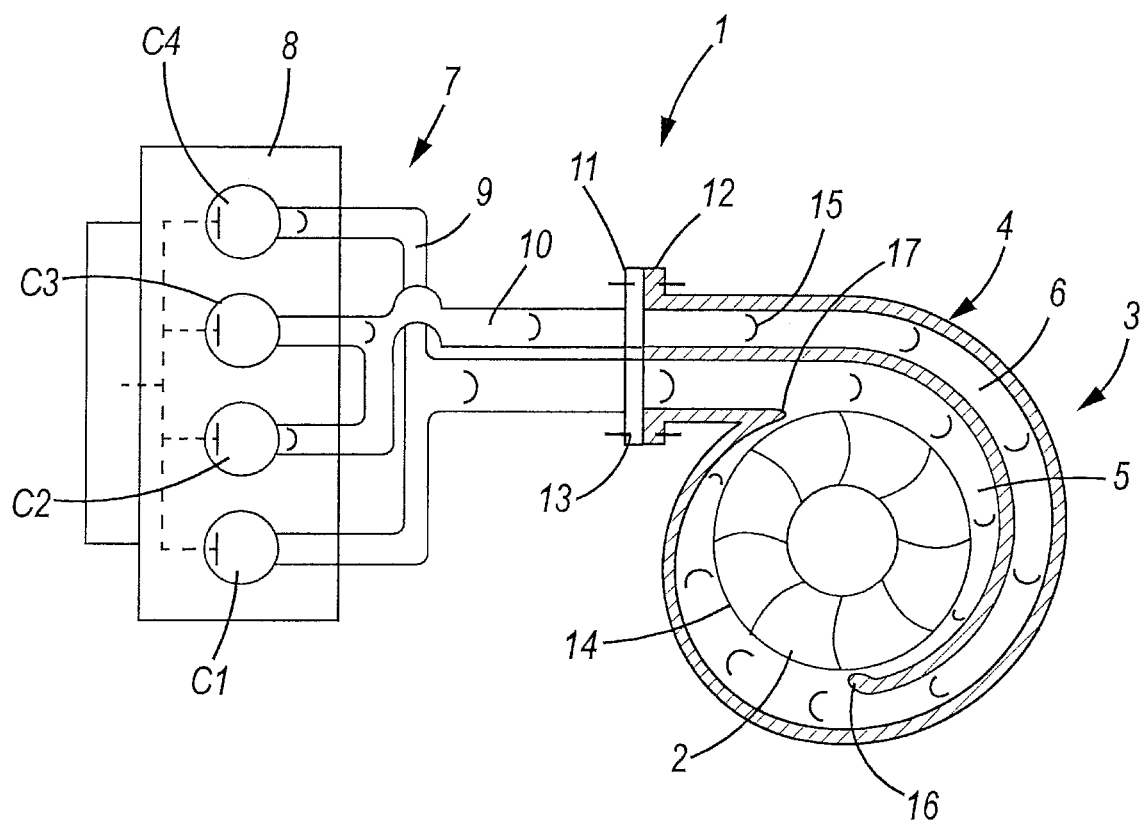
FIG. 1 shows an in-line four cylinder internal combustion engine with exhaust flow separation maintained through exhaust manifolds to a sector-divided dual volute turbine housing.
Figure 2:
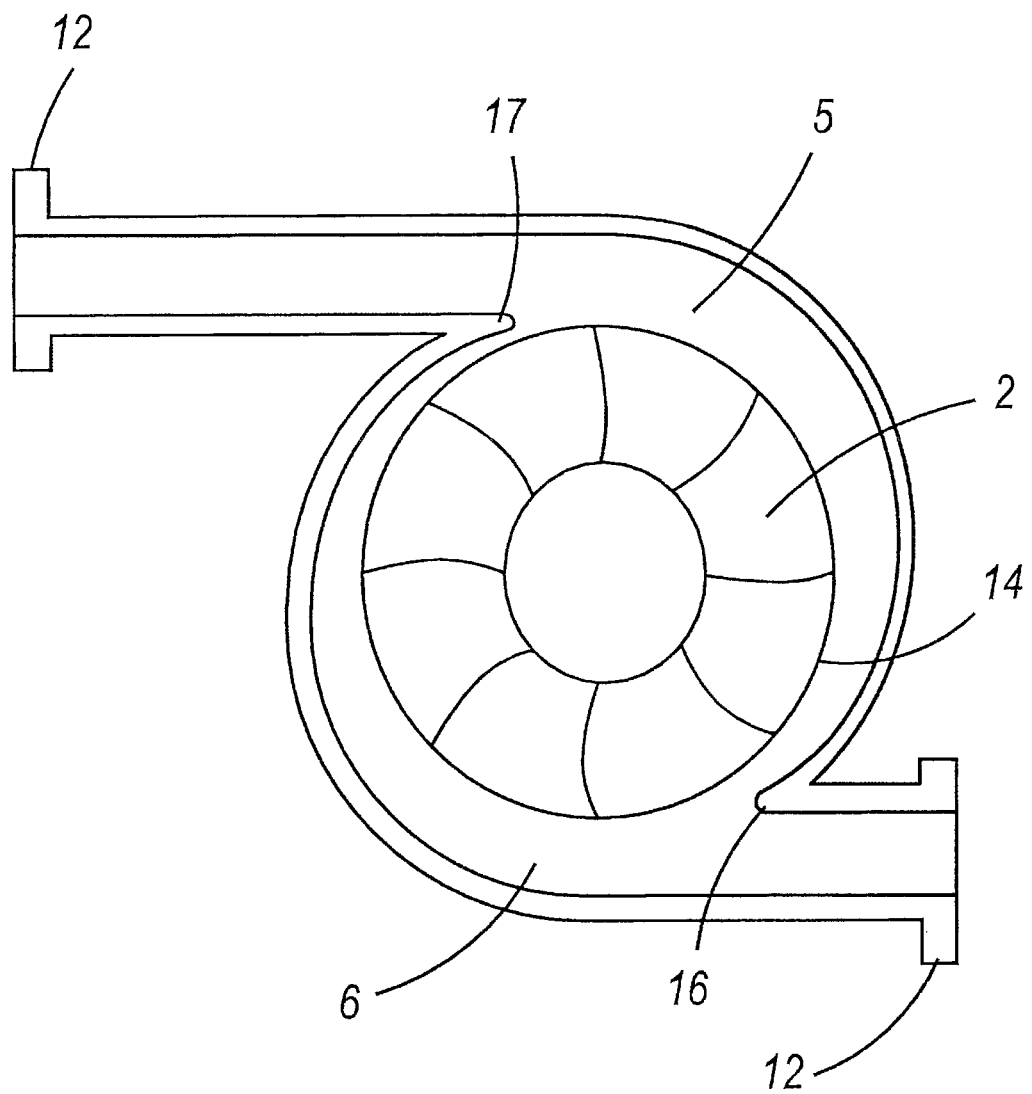
FIG. 2 shows an alternative sector-divided dual volute turbine.

As diagrammatically illustrated in FIGS. 1 and 2, the invention relates to reduction of HCF in a turbine wheel (2) in a sector-divided turbine housing (4) for an exhaust-gas turbocharger system (1) as illustrated in FIG. 1. In this illustrative embodiment, the engine (8) has four cylinders ($C_1$, $C_2$, $C_3$, $C_4$), which release pulses of exhaust gas into a dual exhaust manifold (7). In a typical in line four cylinder engine, the firing order is 1-3-4-2, meaning that the first cylinder $C_1$ combusts first, then the third cylinder $C_3$ combusts second, then the fourth cylinder $C_4$ combusts third, and the second cylinder $C_2$ combusts fourth. Two cylinders ($C_1$, $C_4$) are coupled to a first exhaust manifold pipe (9), and two cylinders ($C_2$, $C_3$) are coupled to a second exhaust manifold (10). The exhaust manifolds have flanges (11, 13) via which they are coupled to turbocharger turbine housing flange (13) with maintenance of continuity of separate exhaust flow channels and thus separation of exhaust pulses (15). By coupling the first and fourth cylinders ($C_1$, $C_4$) together and coupling the second and third cylinders ($C_2$, $C_3$) together, the exhaust pulses released from each cylinder are separated by a maximum amount for the configuration. Stated differently, after the exhaust pulse from the first cylinder $C_1$ enters the first exhaust manifold pipe (9), there is a pause before the exhaust pulse from the fourth cylinder $C_4$ enters the first exhaust manifold (9) because the exhaust pulse from the third cylinder $C_3$ first enters the second exhaust manifold (10). Likewise, after the exhaust pulse from the fourth cylinder $C_4$ enters the first exhaust manifold pipe (9), there is a pause before the exhaust pulse from the first cylinder $C_1$ enters the first exhaust manifold (9) because the exhaust pulse from the second cylinder $C_2$ first enters the second exhaust manifold (10). These pauses result in separation between pulse energies in the exhaust manifolds (9, 10) such that interference between adjacent exhaust pulses in a manifold is reduced. The pulses from the third and fourth cylinders (C3, C4) are similarly separated. The turbine housing (4) has at least two symmetric or asymmetric flow channels (5, 6) that are fluidically substantially separate and can be flowed through by the exhaust gas. A turbine wheel (2) that is rotatably accommodated in the turbine housing (4) can be driven by the exhaust gas impinging on the periphery (14) of the turbine wheel.

The multiple volutes (5, 6) channel the exhaust gas so that it is introduced generally evenly to the circumference (14) of the turbine wheel (2) and expands in the turbine wheel whereby the turbine wheel may convert the exhaust gas into rotational mechanical energy. The pressure and temperature drop is converted into kinetic energy.

From an energy extraction perspective, it is desirable to keep the gap between tongues (16, 17) and turbine wheel as small as possible. However, as each blade of the rotating turbine wheel passes close to the flow obstruction formed by the tongues (16, 17), pressure variations impart an excitation to the blade, causing the blade to vibrate, in the way a tuning fork will vibrate when struck. As the tongues (16, 17) are positioned closer to the turbine wheel, the pressure variations increase, resulting in a greater excitation and therefore greater vibration of the blade. Moreover, with two tongues, each blade will experience two of these excitations per revolution. To minimize this energy transfer to the blades, it is conventional that the inner boundary of the volute (be it meridionally divided or sector divided) has a minimum diameter not less than 106% of the turbine wheel diameter. In contrast, in accordance with the present invention, when the turbine wheel possesses the specified stiffness ratio, it is possible to reduce HCF to acceptable values even when the tongue-to-blade gap is as small as from 1-3% of the wheel diameter, preferably 1-2%.

Figure 3:
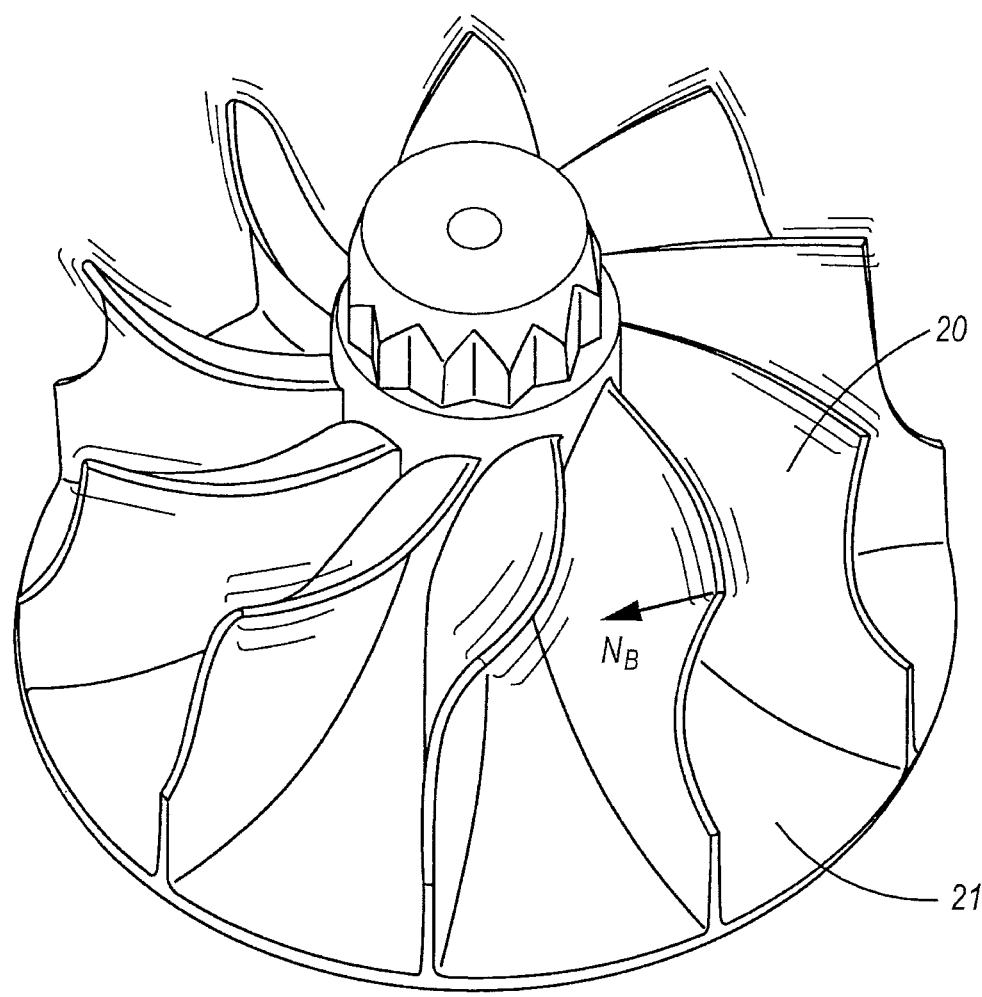
FIG. 3 shows a turbine wheel with an exaggerated vibration at the blade trailing edge and how blade bending is measured.

As illustrated in FIG. 3, in such a turbocharger with sector-divided dual volute turbine housing, when aerodynamic forces act on the turbine blades, the blades are deflected from their static shape, being bent backwards and forwards. The accumulation of vibrational energy without an adequate dissipation mechanism can lead to increasing amplitude of vibration. Repeated bending or deflection leads to material fatigue, cracking and an ultimate fracture, referred to as high cycle fatigue (HCF) failures.

Figure 4:
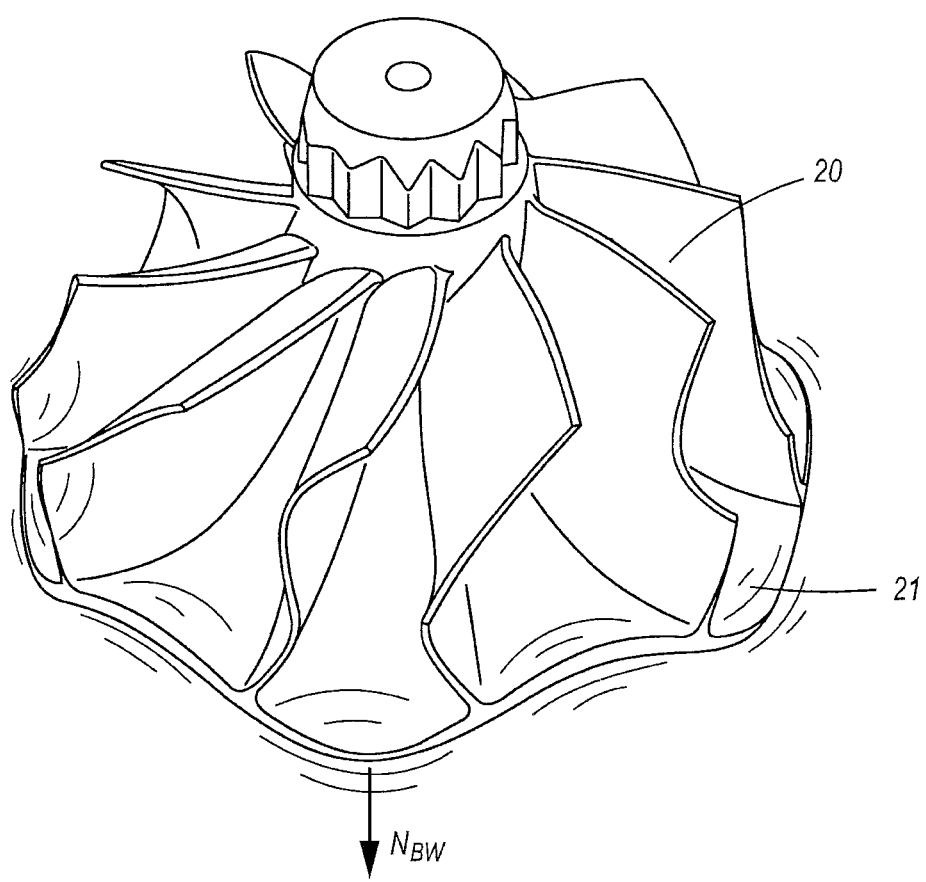
FIG. 4 shows a turbine wheel with an exaggerated vibration at the backwall (disk) and how backwall bending is to be measured.

As illustrated in FIG. 4, vibration of the wheel can also take place at the turbine wheel backwall. Vibration of the backwall can also lead to turbine wheel failure, with backwall failure usually being more serious than blade failure.

During operation, the blades can be subject to vibratory excitation at frequencies which coincide with integer multiples, referred to as harmonics, of the turbine wheel's rotational frequency. As a result of the vibratory excitation, the blades can undergo vibratory deflections that create vibratory stress on the blades. If the vibratory excitation occurs in an expected operating speed range of the turbine, the vibratory stresses can create high cycle fatigue and cracks over time.

Figure 5:
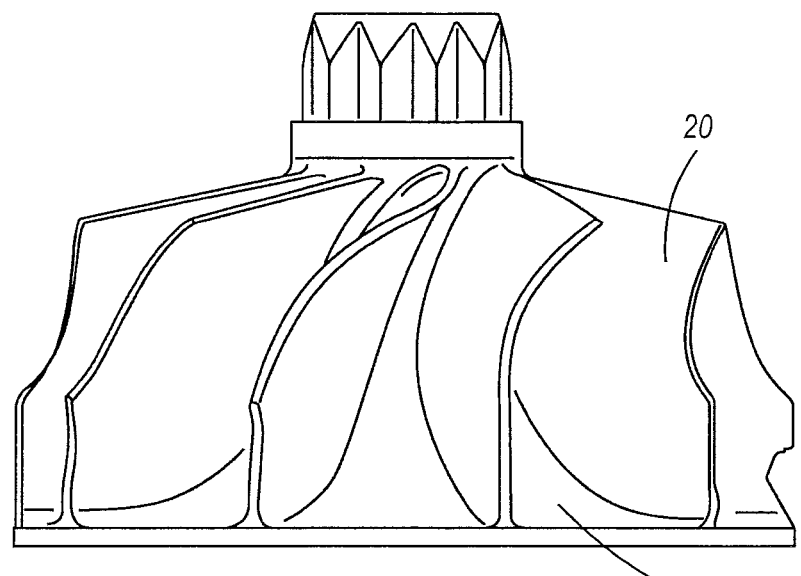
FIGS. 5, 6 show turbine wheel blade failure.
Figure 6:
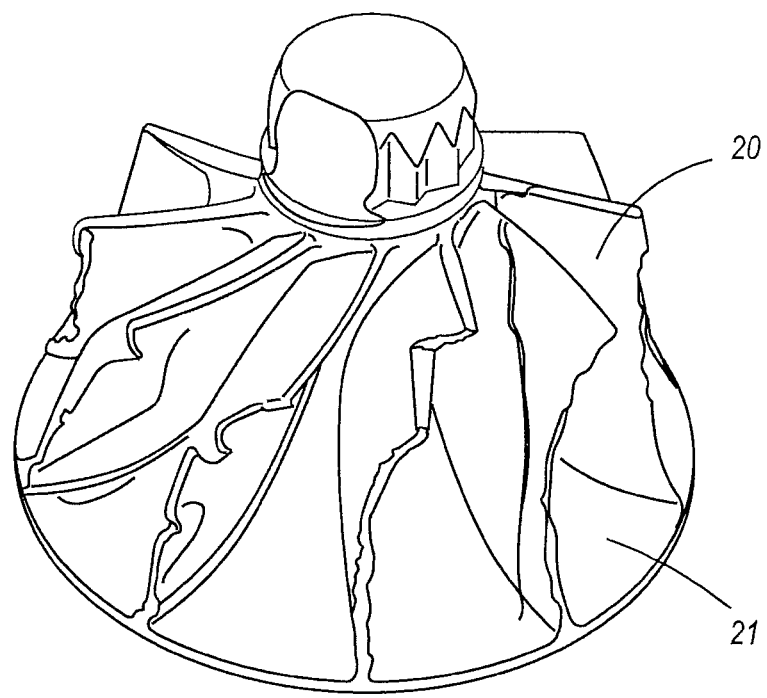

Examples of blade failure are illustrated in FIGS. 5 and 6.

HCF is characterized by low amplitude high frequency elastic strains. HCF is a type of fatigue caused by small elastic strains under a high number of cycles before failure occurs.

Part of the physical design of the turbine housing is the volute, the function of which is to control the inlet conditions to the turbine wheel such that the inlet flow conditions provide the most efficient transfer of power from the energy in the exhaust gas to the power developed by the turbine wheel, combined with the best transient response characteristics. Theoretically the incoming exhaust flow from the engine is delivered in a uniform manner from the volute to a vortex centered on the turbine wheel axis. To do this, the cross-sectional area of the volute is at a maximum perpendicular to the direction of flow gradually and continuously decreasing until it becomes zero. The inner boundary of the dual volute can describe a spiral, of minimum diameter from 102% to 106% of the turbine wheel diameter (i.e., wheel-to-tongue gap from 1-3% of the wheel diameter).

The turbine and turbine wheels according to the present invention are specifically designed to harness pulse energy and convert it to rotational velocity. Thus, the conversion of pressure and velocity from the exhaust gas for a pulse flow turbine wheel in a divided turbine housing is greater than the conversion of pressure and velocity from a steady state exhaust flow to the turbine wheel velocity.

The operation of the turbocharger system of FIG. 1 will now be explained. In sector-divided dual volute (two-scroll, two-tongue) turbo systems, divided turbo manifolds have been designed to feed divided chambers in the volute to enhance the benefits of pulse energy by separating exhaust gas flow into two branches. Gas flow from certain cylinders of an in-line four-cylinder engine, such as $C_2$ and $C_3$, pass through one branch (passageway) of the manifold, and gas from other cylinders, such as $C_1$ and $C_4$, pass through a separate branch. Gas flow from each branch from respective cylinders stay divided in the twin-scroll in the volute of the turbine housing. The resulting two feed ports deliver opposite and equal firing pulsations (15) to improve turbine efficiency and reduce manifold complexity. Divided manifold runners (9, 10), such as for in-line four cylinder configurations, enhance pulse utilization by maintaining separation of alternating pulses (15) of exhaust flow. Similarly, a six-cylinder configuration may have cylinders 1, 2 and 3 combined and have cylinders 4, 5 and 6 combined as separate branches into two feed ports providing alternating pulses. Twin-scroll turbo systems may have higher backpressure at low rpm (which may help turbo spool-up) and lower backpressure at high rpm (which may help top-end performance).

EXAMPLE

The physical attributes of a large number of turbine wheels were carefully measured.

Turbine wheel blade stiffness is measured by applying a force of 100 Newtons to the blade where it is most liable to bend, namely normal ($N_B$; FIG. 3) to the radially outer circumferential end of the trailing edge of the blade. Loading could be virtual in the case of computer simulation, or by load cells, etc., for physical turbine wheels.

Turbine wheel backwall stiffness is measured by applying a force of 100 Newtons to the wheel backwall where it is most liable to bend, namely normal ($N_{BW}$; FIG. 3) to the outer circumferential edge of the backwall disk half-way between blades, and measuring deflection.

Blade thickness, blade uniformity, wheel materials, turbine housing geometry, hub-to-blade-tip variation, wheel balance and eccentricity, tongue-to-blade gap distance, blade-to-blade frequency variations, etc were also measured.

The turbine wheels were subjected to prolonged operation, either by computer simulation or bench top testing, and results carefully measured.

As a result of analysis of a large pool of data, it was surprisingly discovered that there was a low yet commercially-acceptable level of HCF in turbine wheels when the blade to backwall stiffness ratio is between 41 and 44, more preferably when the stiffness ratio is between 41.2 and 43.5, most preferably when the stiffness ratio is between 41.5 and 43.3. The units used in the stiffness ratio may be Newton/mm (i e., force/displacement), for example.

More specifically, the lower bounds of acceptable stiffness ratio are found in a turbine wheel having a blade deflection of 0.02473 mm at 100 Newton and a blade stiffness of 4042.2006, and a disk deflection of 0.010278 mm at 100 Newton and disk stiffness of 9729.5194. The blade to disk stiffness ratio, multiplied by 100, is 41.545737.

The upper bounds of the acceptable stiffness ratio are found in a turbine wheel having a blade deflection of 0.0178 mm at 100 Newton and a blade stiffness of 5620, and a disk deflection of 0.0769 mm at 100 Newton and disk stiffness of 13000. The blade to disk stiffness ratio, multiplied by 100, is 43.23921.

Accordingly, it was discovered that HCF is reduced to acceptable levels when blade to backwall stiffness ratio (×100) is between 41 and 44, more preferably when the stiffness ratio is between 41.2 and 43.5, most preferably when the stiffness ratio is between 41.5 and 43.3.

It will be appreciated that the configurations and routines disclosed herein are exemplary in nature, and that these specific embodiments are not to be considered in a limiting sense, because numerous variations are possible. For example, the above technology can be applied to I-4, I-6, V-6, V-12, opposed 4, and other engine types. Moreover, the above-described turbine housing could be used with a two cylinder engine, such as a V-twin or inline two-cylinder engine, wherein exhaust gas pulses from each of the two cylinders is directed to one of the two volutes.

In at least one embodiment, the above-described turbine configuration may be used with a turbine housing with a volute that is both sector divided and meridonally divided. Stated differently, the turbine housing may be divided into two volutes with circumferentially-spaced tongues and each of the two volutes may be divided transversely by an integral wall. Such a turbine housing would have four divided volutes. Such a turbine housing is described by U.S. Pat. No. 3,218,029 and U.S. Publication No. 2017/0183975 A1. Such a turbine housing may be advantageously applied with a four cylinder engine such that the exhaust pulses for each cylinder travels through a separate volute. Such a turbine housing could also be used with an eight cylinder engine, a twelve cylinder engine, or a sixteen cylinder engine (or any other engine with a total number of cylinders that is an integer multiple of four).

The above-described turbine could also be used with an internal combustion engine having an uneven number of cylinders, such as a three-cylinder engine or a five-cylinder engine. In such configurations, a greater number of cylinders would exhaust to a first volute than to a second volute. For example, in a three-cylinder engine, cylinders 1 and 2 may exhaust to the first volute (5) and cylinder 3 may exhaust to the second volute (6). Likewise, in a five-cylinder engine, cylinders 1, 3, and 4 may exhaust to the first volute (5) and cylinders 2 and 5 may exhaust to the second volute (6). To accommodate the different volumetric flow rates caused by the different numbers of cylinders exhausting to the two volutes, the two volutes (5, 6) may have different cross-sectional flow areas. In the above-described examples of three and five-cylinder engines, the second volute (6) may have a smaller cross-sectional area than the first volute (5) since less exhaust gas passes through the second volute (6).

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

We claim:

1. A method for reducing turbocharger failure due to high cycle fatigue (HCF) in a turbine wheel (2) of the turbocharger, the method comprising:
    selecting a turbine wheel (2) to evaluate, the turbine wheel (2) having a disk-shaped wheel backwall (21) which has a circular circumferential edge, a hub which extends axially from the wheel backwall (21) and which tapers along the axial direction, and a multiplicity of turbine blades (20) which extend radially outward from the hub and which have a trailing edge,
    applying a bending force to a turbine blade (20) and measuring stiffness,
    applying a bending force to the backwall (21) and measuring stiffness,
    determining the ratio of blade stiffness to backwall stiffness, and
    installing the turbine wheel in a turbocharger only if a blade stiffness to backwall stiffness ratio, multiplied by 100, is of from 41 to 44, when stiffness is measured by:
    applying a force of 100 Newtons normal to the radially outer circumferential end of the trailing edge of the blade (20) and to the outer circumferential edge of the backwall (21) half-way between blades,
    measuring blade deflection and backwall deflection, and
    deriving blade and backwall stiffness from the blade deflection and backwall deflection.

2. The method as in claim 1, wherein the blade stiffness to backwall stiffness, multiplied by 100, is limited to from 41.2 to 43.5.

3. The method as in claim 1, wherein the blade stiffness to backwall stiffness ratio, multiplied by 100, is limited to from 41.5 and 43.3.

4. The method as in claim 1, wherein the bending force is 100 Newtons.

5. The method as in claim 1, wherein the disk stiffness of the turbine wheel is between 4042 and 5620 Newtons/meter.

6. The method as in claim 1, wherein the disk stiffness of the turbine wheel is between 9729 and 13000 Newtons/meter.

7. A method for optimizing energy extraction in a dual volute turbine of a turbocharger wherein each volute ends in a tongue, the method comprising
    rotatably mounting in the turbocharger turbine housing a turbine wheel (2) comprising a disk-shaped wheel backwall (21) which has a circular circumferential edge, a hub which extends axially from the wheel backwall and which tapers along the axial direction, and a multiplicity of turbine blades (20) which extend radially outward from the hub and which have a trailing edge,
    the turbine wheel (2) characterized by a blade stiffness to backwall stiffness ratio, multiplied by 100, of from 41 to 44, as determined by applying a bending force to a turbine blade (20) and measuring stiffness, applying a bending force to the backwall (21) and measuring stiffness, and determining the ratio of blade stiffness to backwall stiffness, wherein stiffness is measured by applying a force of 100 Newtons normal to the radially outer circumferential end of the trailing edge of the blade and to the outer circumferential edge of the backwall (21) half-way between blades, measuring blade deflection and backwall deflection, and deriving blade and backwall stiffness from the blade deflection and backwall deflection, and
    setting a gap between the tongues (16, 17) and passing turbine blades (20) to from 1-3% of the wheel diameter.

8. The method as in claim 7, wherein the blade stiffness to backwall stiffness, multiplied by 100, is from 41.2 to 43.5.

9. The method as in claim 7, wherein the blade stiffness to backwall stiffness ratio, multiplied by 100, is from 41.5 and 43.3.

10. The method as in claim 7, wherein the turbine wheel has a blade stiffness of from 4042 to 5620 Newtons/meter.

11. The method as in claim 7, wherein the turbine wheel has a blade stiffness of from 9729 to 13000 Newtons/meter.

12. The method as in claim 7, wherein the gap between the tongues (16, 17) and passing turbine blades (20) is from 1-2% of the wheel diameter.

\* \* \* \* \*